US011347082B2

(12) United States Patent
Lapidot et al.

(10) Patent No.: US 11,347,082 B2
(45) Date of Patent: May 31, 2022

(54) SMARTPHONE-ASSISTED PORTABLE AUGMENTED REALITY (AR) DEVICE AND CLIP-ON UNIT FOR ADJUSTABLE ATTACHMENT TO A USER'S SPECTACLES

(71) Applicant: VEERIDE LTD., Rehovot (IL)

(72) Inventors: Zvi Lapidot, Rehovot (IL); Ehud Tirosh, Mevaseret Zion (IL); Oded Arnon, Tel-Aviv (IL); Uri Samet, Tel-Aviv (IL)

(73) Assignee: VEERIDE LTD., Rehovot (IL)

( * ) Notice: Subject to any disclaimer, the term of this patent is extended or adjusted under 35 U.S.C. 154(b) by 0 days.

(21) Appl. No.: 17/053,941

(22) PCT Filed: May 7, 2019

(86) PCT No.: PCT/IL2019/050522
§ 371 (c)(1),
(2) Date: Nov. 9, 2020

(87) PCT Pub. No.: WO2019/215739
PCT Pub. Date: Nov. 14, 2019

(65) Prior Publication Data
US 2021/0223575 A1    Jul. 22, 2021

(30) Foreign Application Priority Data
May 10, 2018   (IL) .......................... 259276

(51) Int. Cl.
*G02C 9/04*   (2006.01)
*G02B 27/01*  (2006.01)
*G02C 11/00*  (2006.01)

(52) U.S. Cl.
CPC ........... *G02C 9/04* (2013.01); *G02B 27/0176* (2013.01); *G02C 11/10* (2013.01);
(Continued)

(58) Field of Classification Search
CPC . G02C 9/04; G02C 9/00; G02C 11/10; G02C 11/00; G02B 27/0176;
(Continued)

(56) References Cited

U.S. PATENT DOCUMENTS 9,733,482 B2 *  8/2017  West .................. G02B 27/0179
9,740,008 B2 *  8/2017  Mukawa ............... G02F 1/0136
(Continued)

FOREIGN PATENT DOCUMENTS

WO      2009128563 A1    10/2009

OTHER PUBLICATIONS

Mourtzis et al; Augmented Reality Application to Support Remote Maintenance as a Service in the Robotics Industry; CIRP Conference on Manufacturing Systems; 2017; pp. 46-51.
(Continued)

*Primary Examiner* — William R Alexander
(74) *Attorney, Agent, or Firm* — Niels Haun; Dann, Dorfman, Herrell & Skillman, P.C.

(57) ABSTRACT

A detachable spectacles-mounted augmented reality (AR) device and clip-on unit wherein the device has a housing (31) configured for detachably supporting the clip-on unit, an exit window (30) and an entrance window (30') in the housing through which the user observes a scene, a communications interface (71, 74) for coupling to a hand-held device, and a camera (37) inside the housing for imaging the scene observed by the user through a camera window (36) and configured to convey an image of the scene to the hand-held device. A line-of-sight guide unit (39) displays at least one marker at the user's field of view for directing a line of sight of the user toward a designated feature in the scene, and optics (40) within the housing projects the marker at a distance for superimposing on to the scene viewed by the user.

19 Claims, 9 Drawing Sheets

(52) U.S. Cl.
CPC ............... *G02B 2027/0138* (2013.01); *G02B 2027/0156* (2013.01); *G02B 2027/0178* (2013.01); *G02B 2027/0198* (2013.01)

(58) Field of Classification Search
CPC .................. G02B 27/017; G02B 27/01; G02B 2027/0138; G02B 2027/0156; G02B 2027/0178; G02B 2027/0198
USPC ........................................................... 351/57
See application file for complete search history.

(56) References Cited

U.S. PATENT DOCUMENTS

| | | | |
|---|---|---|---|
| 10,534,184 B2 * | 1/2020 | Gupta | H04N 7/183 |
| 11,029,524 B2 * | 6/2021 | Jiang | G02B 27/0176 |
| 2009/0213038 A1 | 8/2009 | Huang | |
| 2014/0176398 A1 * | 6/2014 | West | G02B 27/0176 |
| | | | 345/8 |
| 2014/0300632 A1 | 10/2014 | Laor | |
| 2015/0219897 A1 * | 8/2015 | Mukawa | G02B 27/0172 |
| | | | 345/8 |
| 2016/0223821 A1 | 8/2016 | Seo | |
| 2017/0235161 A1 | 8/2017 | Hilkes | |
| 2018/0180893 A1 * | 6/2018 | Gupta | H04N 7/185 |
| 2019/0250412 A1 * | 8/2019 | Jiang | G06F 3/011 |

OTHER PUBLICATIONS

Tuceryan; Single-Point Active Alignment Method for Optical see-through TMD Calibration for Augmented Reality; Presence vol. 11 No. 3; Jun. 2002; pp. 259-276.
International Search Report and Written opinion dated Aug. 12, 2019 from PCT/IL2019/050522.
International Preliminary Report on Patentability for PCT/IL2019/050522.
Office Action dated Jul. 14, 2021 in corresponding application IL 259276 and English Translation.
Notice of Allowance in corresponding application IL 259276 and English Translation.
Allowed claims in corresponding application IL 259276.
Response to Office Action dated Jul. 14, 2021 in corresponding application IL 259276 as filed.
Claims as filed in corresponding application IL 259276.

* cited by examiner

SMARTPHONE-ASSISTED PORTABLE AUGMENTED REALITY (AR) DEVICE AND CLIP-ON UNIT FOR ADJUSTABLE ATTACHMENT TO A USER'S SPECTACLES

PRIORITY APPLICATIONS

This application is a 371 application of International Application No. PCT/IL2019/050522 filed May 7, 2019, which claims priority to Israel Application No. 259276 filed May 10, 2018. Each of the foregoing applications is hereby incorporated herein by reference.

FIELD OF THE INVENTION

This invention relates generally to optical head mounted displays and in particular to a portable Augmented Reality (AR) device for attachment to a user's spectacles.

BACKGROUND OF THE INVENTION

AR systems have been implemented for some time as Helmet Mounted Systems for aviation, enabling fighter pilots to designate and to display object related information overlaid on reality. An example of such a device is the Gentex Scorpion™ which allows pilots to designate targets with a high degree of accuracy, by simply "looking at" the target or point of interest. AR systems have also been used as eyewear like Head Mounted Systems such as Microsoft Hololens™. Both implementations are expensive and cumbersome. To overcome size and cost, dedicated eyeglasses with built-in AR capabilities have also been developed such as Vuzix®. See, for example, Vuzix Blade https://www.vuzix.com/products/blades-smart-glasses.

Further attempts include the development of detachable modules incorporated in standard eyewear. Examples include Sony: https://techcrunch.com/2014/12/17/sony-glasses-attach/and Arduino: https://hackaday.io/project/12211-arduino-glasses-a-hmd-for-multimeter. Both of these modules are side mounted, i.e. attached to the side arm of a spectacles frame and contain optics for directing AR information to the user's eye. The Sony module is not see-through and therefore no AR information can be overlaid on the real scene. Arduino module is see-through, but includes no mechanism for aligning the AR information on the real scene. Modules are also equipped with a see-through display for projecting the AR information on the landscape. These optics, particularly the see-through display, need to be aligned with the user's eye location and since users vary in head shape and specifically in their pupillary distance (PD), the module design should take this variety into account so that the module can be used by different users, regardless of eye location. One solution is to design the optics with an increased eye motion box so that they can fit a wide range of users. The eye motion box or exit pupil is the area where the eye can be placed in order to see the full display. Such a solution complicates the optical design and makes the system larger and heavier. Another possible solution might be to add an alignment system for moving the optics to the right of left relative to the user's eye. However, since the module is mounted on the eyeglasses sidearm, moving the module to the right of left would require a complex, bulky mechanism.

Another drawback of side mounted modules is their blocking of the user's peripheral vision. Peripheral vision plays an important role in identification of movements at the periphery, in providing sensation of the background and situational awareness. Blocking the peripheral vision gives the user sense of inconvenience and in some cases may have negative impact on his safety.

WO 2017/142480 discloses a modular heads-up augmented reality (AR) display system that is removably attached onto a host spectacle or onto a helmet. The system includes processor module, a battery module, a trunking module disposed between the processor and battery, and a display (projection) module. The processor and battery modules are attachable onto separate temple pieces of the host spectacle whilst the trunking module is attachable onto a front frame member thereof and serves to connect the battery to the processor. A body of the projection module has a see-through prism proximate to an eye of the user.

SUMMARY OF THE INVENTION

To address at least some of the above limitations, the invention proposes a detachable AR module that is dimensioned to clip-on to the front of a spectacle frame. Left and right alignment of the module relative to the user's eye is done by a compact mechanism which is part of the clip. As a result, the see-through display is positioned accurately in front of the user's eye and a small size eye motion box is sufficient, enabling a design of compact, low cost optics. This is achieved without limiting the user's peripheral vision and without the need to mount either the display optics or electronics in the temple pieces of the user's spectacles, which may therefore be conventional light-weight spectacles whose eyepieces have plain or prescription lenses or even no lenses.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following description of some embodiments, identical components that appear in more than one figure or that share similar functionality will be referenced by identical reference symbols.

Figure 1:
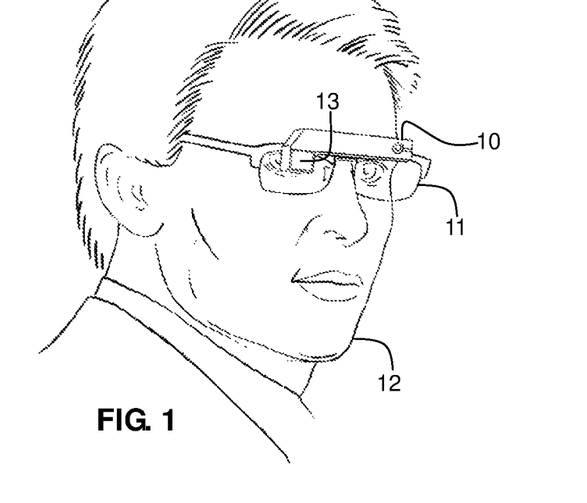
FIG. 1 is a pictorial representation of a user wearing a device according to the invention.

FIG. 1 shows an AR device 10 according to the invention that is detachably clip-mounted on to the front of a spectacles frame 11 worn by an observer constituting a local user 12. By such means the device is mounted directly in front of the local user's eyes, allowing him to observe a scene through an exit window 13. Also, the local user can see graphical annotations projected to his eye by the detachable device 10 and overlaid on the real scene. There is no need to mount the device or any of its components on the temple pieces (side arms) of the user's spectacles.

Figure 2:
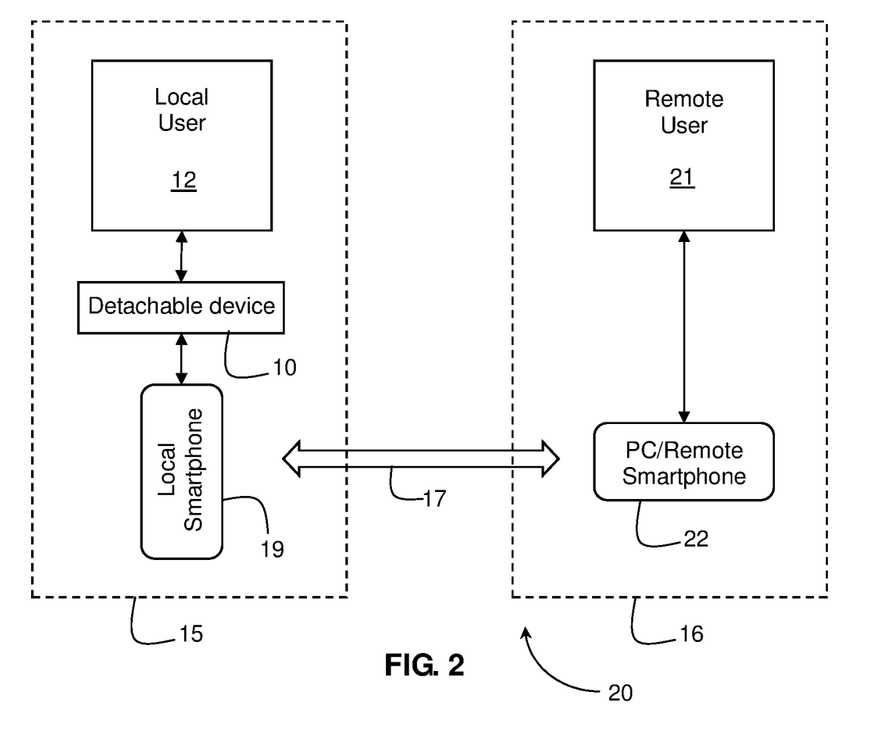
FIG. 2 is a block diagram showing functionality of a system according to the invention.

FIG. 2 shows schematically a system 20 that uses the device 10 in a typical scenario. The local user 12 is positioned at a local station 15 that communicates with a remote station 16 via a communication channel 17, such as the Internet. To this end, the device 10 communicates wirelessly e.g. via Bluetooth™ or WiFi or via a wired connection such as a USB cable, to a local smartphone 19. A remote user 21 located at the remote station 16 communicates wirelessly with the local station 15 using a remote communications device such as a smartphone 22 or a PC having a communications interface such as Internet.

Typical use of this configuration is remote support in which, for example, the local user 12 is a technician repairing equipment and the remote user 21 is a higher support level engineer.

Figure 3A:
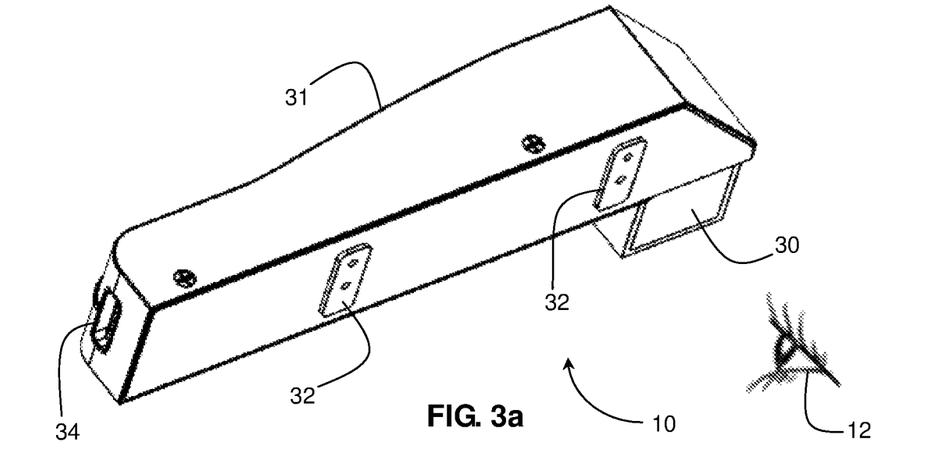
FIGS. 3a and 3b are pictorial representations of the detachable device when seen from the rear and front respectively.

FIG. 3a is a pictorial representation showing a rear view of the device 10. The local user 12 sees the real scene through an exit window 30 and also sees a graphical annotation overlaid on this scene. These annotations may include marks, text, graphical shapes etc. The detachable device has a housing 31 to which there are fixed mounting brackets 32 for supporting a clip-on unit described below with reference to FIGS. 4a and 4b by means of which the device 10 is clipped on to the front of the user's eyeglasses. Optionally, a USB connector 34 is provided for coupling the device 10 to the smartphone 19.

Figure 3B:
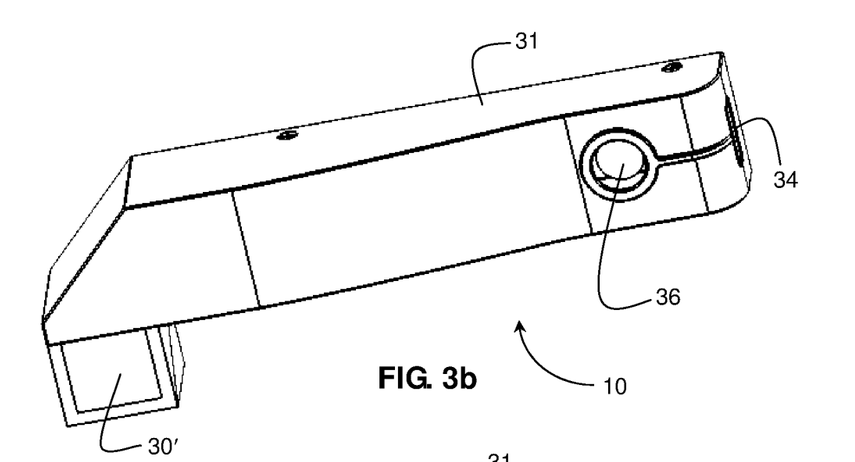

FIG. 3b shows a front view the detachable device 10 as see from the front, i.e. looking towards the local user 12. A window 36 is provided through which a built-in camera 37 located inside the device and shown schematically in dotted outline in FIG. 3c images the external scene. Also shown is an entrance window 30' through which light from scene passes to the exit window 30, to be observed by the user.

Figure 3C:
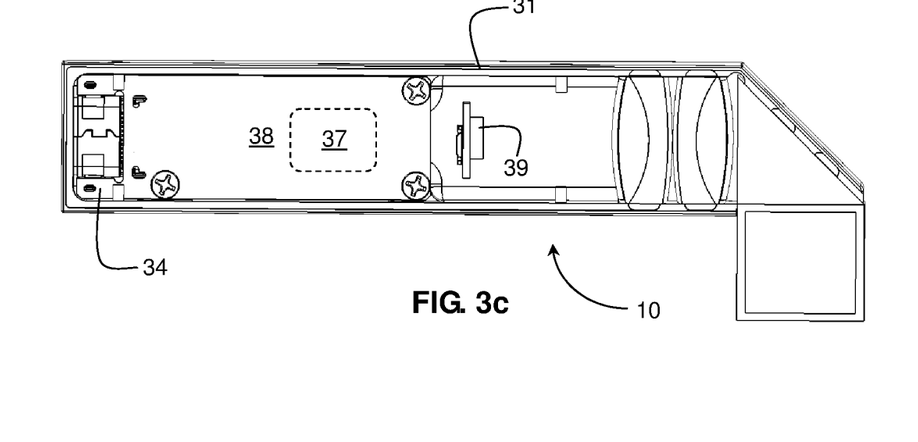
FIG. 3c is a partially cut-away view of the detachable device when seen from the rear showing partial details of the optics contained therein.

FIG. 3c shows in more detail the inner structure of the device 10. A printed circuit board (PCB) 38 supports an electronic circuit for the electronic operation of the detachable device. Also connected to the PCB 38 are the USB connector 34, a micro-display 39 and the built-in camera 37. The camera 37 is configured to acquire wide angle still or video images through the camera window 36 of the view observed by the local user 12. Its function will be further explained below with reference to FIGS. 5, 6 and 7. In an embodiment reduced to practice, a Misumi MD-B31107U-77, ⅛" color digital camera module was used with built-in USB connection. Other characteristics of this camera are:

Frame size: 1920×1080 pixels
Pixel size: 1.4 μm×1.4 μm
Lens: f=1.83 mm, F/2
Field of View: H:70°, V:42.7°, D:77.3°

Figure 3D:
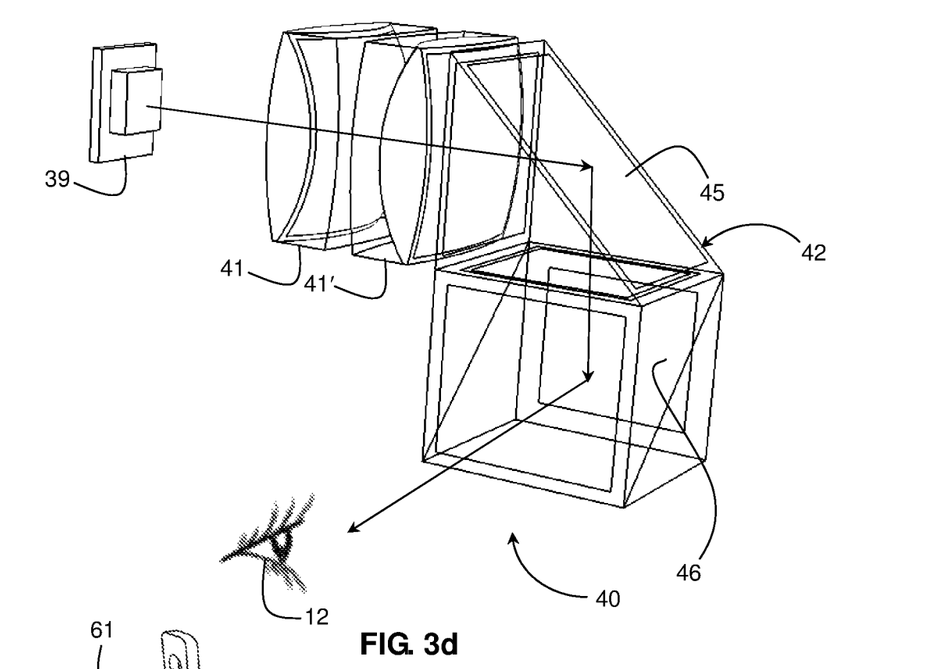
FIG. 3d is a schematic representation of the optics.

The micro-display 39 is a high-brightness monochrome display having the following main characteristics:

Number of pixels: 304×256
Pixel size: 12 μm×12 μm
Active area: 3.648 mm×3.972 mm The device 10 houses optics 40 shown in FIG. 3d, which includes two doublets 41, 41' and a combined prism 42. The doublets 41, 41' create a combined objective with equivalent focal length of 21 mm. The light emitting plane of the micro-display 39 is located at the focal plane of this combined objective so that an image of the display is created at infinity, whereby the local user 12 sees the image on the display projected on the real scene. A typical image of the screen includes a cross-shaped marker shown as "A" in FIG. 5, used by the local user to designate an object in his field of view. The image is further folded, as illustrated by the arrows, first by a mirror surface 45 of the combined prism 42 and then is directed to the eye of the local user 12 by a partial mirror surface 46, which allows light from the display 39 to reach the local user's eye, and at the same time allows the local user to see the real scene transmitted through the partial mirror surface 46 via the exit window 30 in FIG. 3b. Typically, the partial mirror surface 46 has a reflection of ~50% and transmission of ~50%. Since the focal length of the combined doublets is 21 mm, the display screen captures a Field of View of H: 10×V: 8.3 degrees (13 degrees diagonal). The optical design allows the local user an eye motion box of 4.5 mm diameter.

Figure 4A:
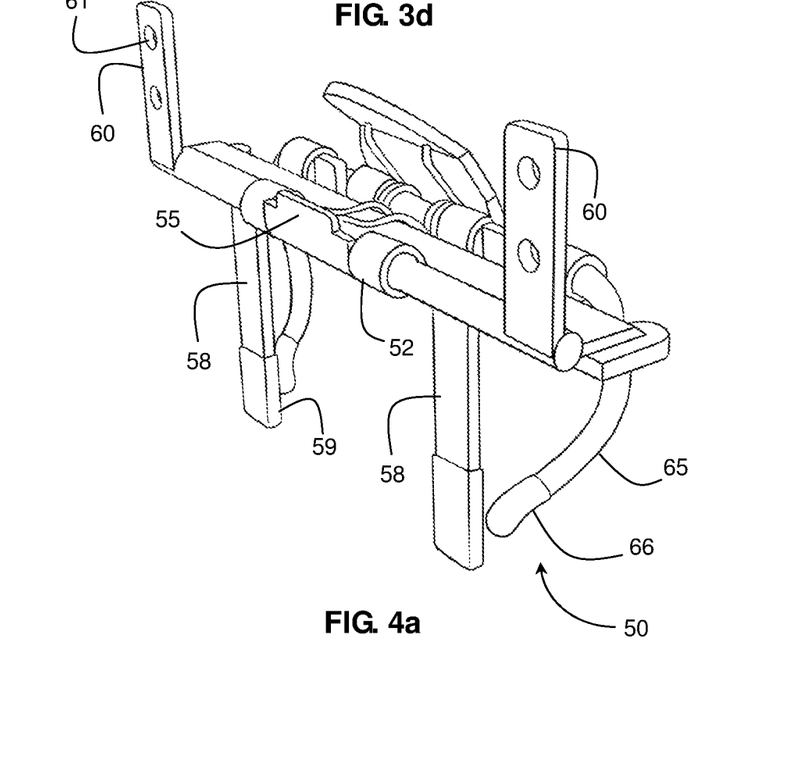
FIGS. 4a and 4b show respectively assembled and exploded views of a clip-on unit used to attach the device to the front of a user's spectacles.
Figure 4B:
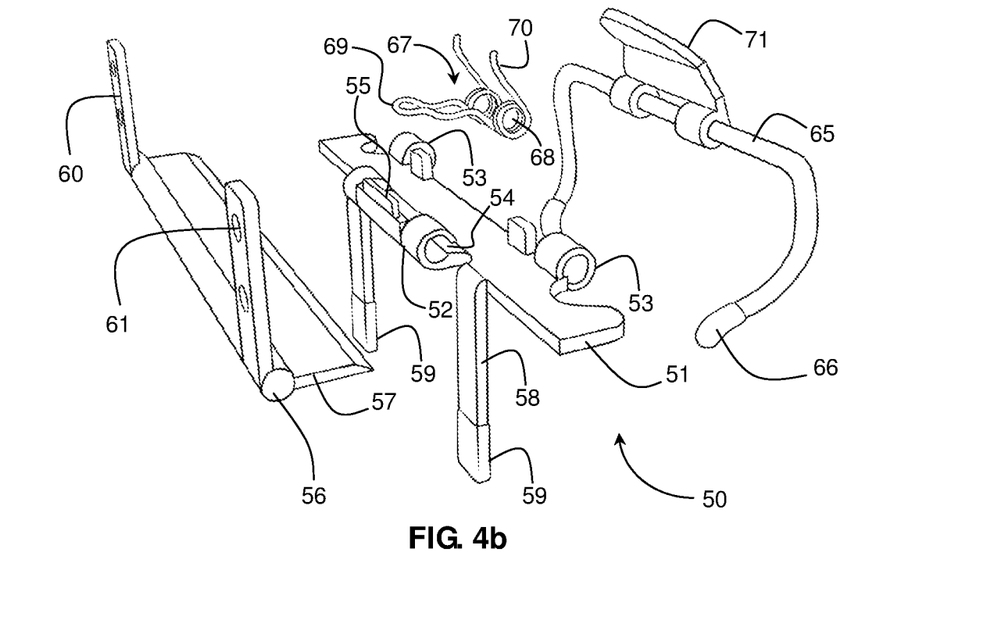

FIGS. 4a and 4b show respectively assembled and exploded views of a clip-on unit 50 by means of which the device 10 is attached to and aligned with the local user's spectacles 11. The clip-on unit 50 comprises an elongated planar support 51 having on opposite sides thereof respective knuckles 52 and 53 each accommodating respective pins so as to form respective hinge joints. The knuckles 52 are of the form of a pair of displaced C-shaped cylindrical sockets having an open slot 54 between which there is mounted an upwardly projecting abutment 55. The other hinge element is an elongated pin 56 to which there is welded along its length a base portion 57 having a thickness slightly less than the slot 54 so as to allow the pin 56 and the base portion 57 to be inserted from one end into the knuckles 52 thus forming a hinge. On opposite sides of the knuckles 52, the base portion 51 supports a pair of downwardly projecting armatures 58 whose ends are covered with a protective sleeve 59 formed of soft plastic or rubber. After insertion of the pin 56 and attached base portion 57 into the knuckles 52, a pair of upwardly extending armatures 60 is welded to the pin 56 at opposite ends thereof. Each armature 60 has apertures 61 allowing the clip 50 to be attached by screws (not shown) to the mounting brackets 32 of the device 10 as shown in FIG. 3a.

The knuckles 53 support a clip arm 65 having an elongated straight portion and downwardly dependent arms each of whose ends is covered with a protective sleeve 66 formed of soft plastic or rubber. The clip arm 65 is dimensioned so that when mounted in the knuckles 53, the ends 66 meet and abut against the protected ends 59 of the armatures 58. The elongated straight portion of the clip arm 65 supports an L-shaped spring element 67 in the form of a coil spring having a hollow core 68 and side portions 69 and 70. An upwardly projecting handle 71 fixed to the straight portion serves as a support for the side portion 70 while the other side portion 69 is supported by the base portion 51. In order to mount the clip arm 65 which forms the hinge pin inside the knuckles 53 it can either be inserted prior to shaping or the knuckles may be formed only after positioning the clip arm.

In use, after attaching the device 10 to the upwardly extending armatures 60 as described above, the assembly is clipped on to the local user's spectacles with the frame 11 gripped under the resilient force of the spring 67 between the downwardly projecting armatures 58 at its rear and the clip arm 65 at its front. Once mounted on to the local user's spectacles in this manner, the device 10 may be moved laterally owing to the freedom of movement of the pin 56 within the knuckles 52. The side portion 69 of the spring 67 applies moderate force to the base portion 57, which on the one hand militates against unwanted rotation and lateral movement of the pin 56 while allowing the pin to be moved to and fro by the local user when desired so as to shift the device 10 laterally relative to the spectacles frame 11. It should be noted that although the apertures 61 are shown as round, they may be elongated and the armatures 60 may be attached to the device using spring-loaded bolts so as to allow a small amount of vertical up and down movement of the device 10 relative to the spectacles frame 11. This allows proper adjustment so as to align the device relative to the eyes of the local user as will now be explained with reference to FIG. 5. The clip-on unit may be detachable from the device or integral therewith. In either case, the clip-on unit allows the device to be detachably mounted in front of a spectacle frame and to be laterally displaceable relative to the spectacle frame for aligning the exit window of the device with a line of sight of the user.

Figure 5:
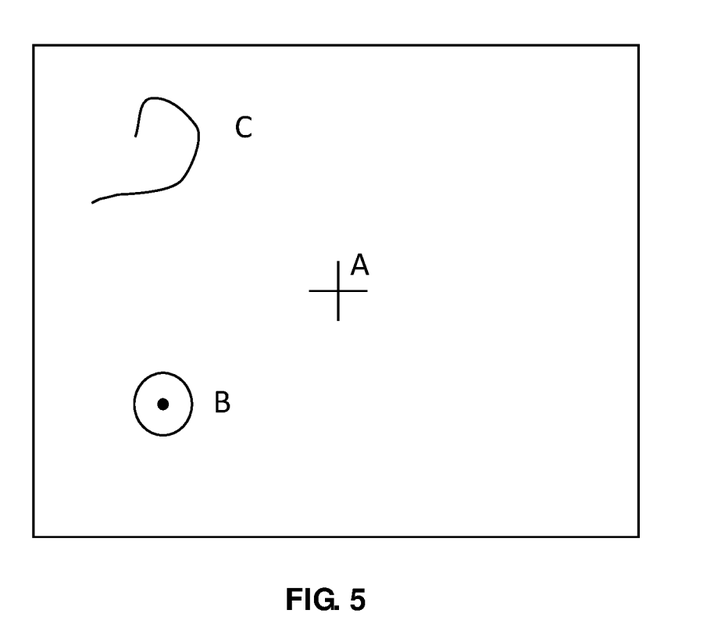
FIG. 5 shows exemplary annotations which can appear on the screen of the micro-display.

FIG. 5 shows exemplary annotations which can appear on the screen of the micro-display 39, including a cross denoted as "A" located at the center of the micro-display screen, another mark B and squiggle C. A typical use of such annotations will be detailed below. The annotations are displayed under control of a software application executed by the local smartphone 19, which is coupled to the device 10 as described below with reference to FIGS. 6*a* and 6*b* of the drawings. The cross A provides an indication that the micro-display 39 is properly centrally aligned relative to the local user's line of sight so that when the local user's eyes are directed at a remote object, the cross A located at the center of the micro-display screen appears at the center of the remote object.

Figure 6A:
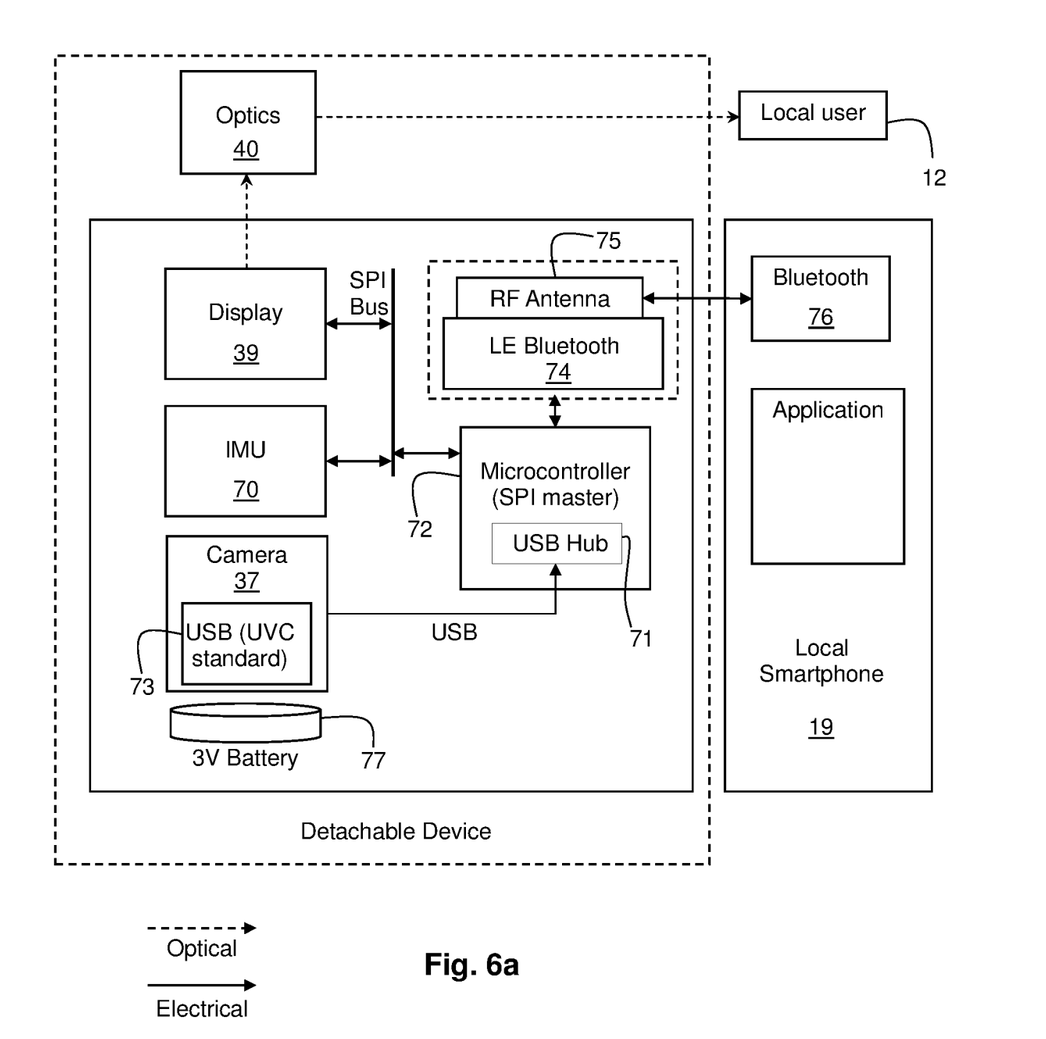
FIGS. 6a and 6b are block diagrams of the device in wireless and wired configurations, respectively.
Figure 6B:
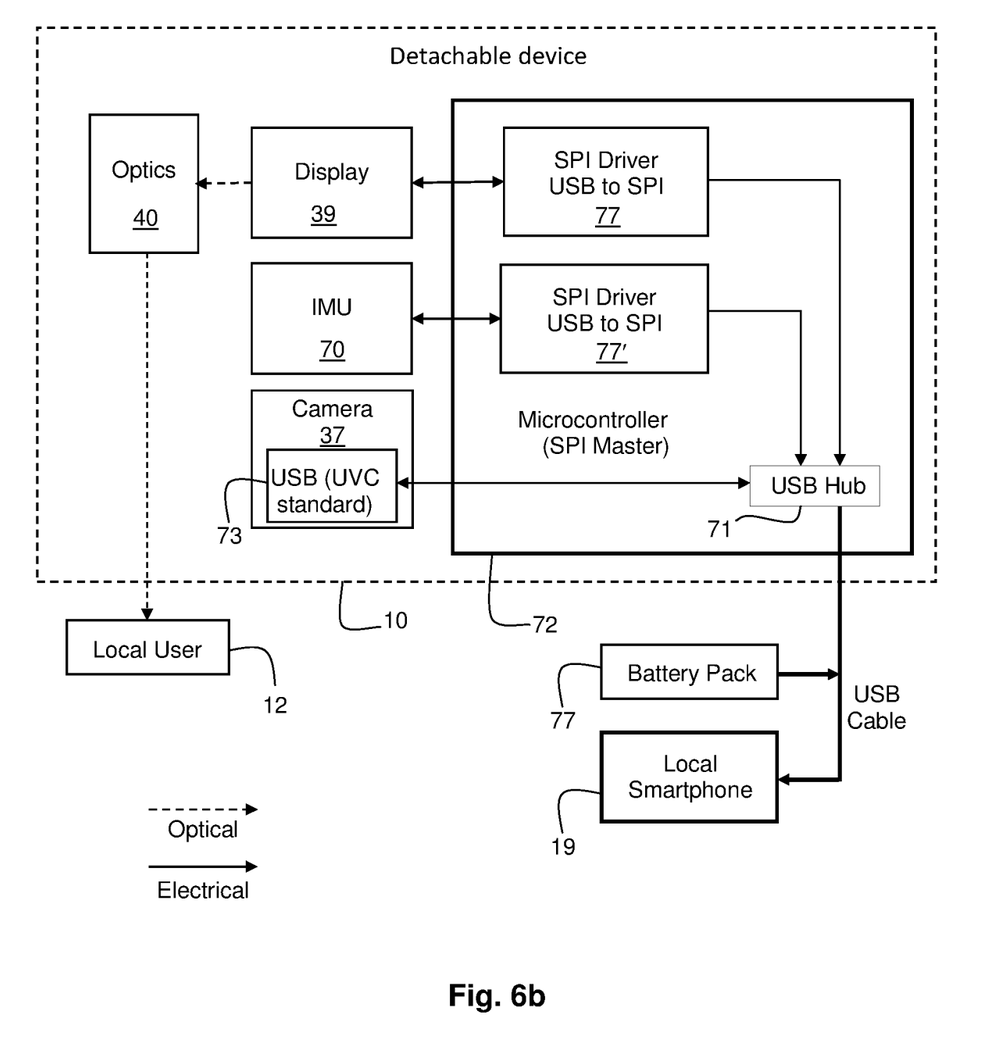

FIGS. 6*a* and 6*b* are block diagrams of the device 10, in wireless and wired configurations, respectively.

Thus, with reference to FIG. 6*a*, optics 40 as described above project to the eye of the local user 12 the micro-display 39 whose screen image is thus overlaid on the external scene. In addition to the camera 37 to which reference has already been made, the device 10 also includes an Inertial Magnetic Unit (IMU) 70 for tracking motion of the device and thereby head motion of the local user. The micro-display 39, the camera 37 and the IMU 70 are connected to a USB hub 71 implemented in a microcontroller 72. To this end the camera 37 has a UVC standard USB interface 73. The microcontroller 72 also processes the data for two-way communication with a Low Energy (LE) Bluetooth™ unit 74 via an RF antenna 75. The Bluetooth™ unit 74 communicates with a Bluetooth™ unit 76 in the local smartphone 19. A built-in battery 77 provides power to the device components.

FIG. 6*b* shows an alternative embodiment using USB wired communication. The microcontroller 72 contains SPI (Serial Peripheral Interface) drivers and USB to SPI converters 77, 77' which connect the display 39 and the IMU 70, respectively to the USB hub 71. The USB hub 71 connects to the local smartphone 21 via a USB cable. An optional battery pack 77 may be used to supplement the smartphone battery.

Operation Description

As explained above, the detachable device 10 combined with the smartphone 19, enables the local user 12 e.g. an equipment operator or technician to communicate with the remote user 21 who may be an instructor or higher level engineer, using visual information and guidance, in addition to regular audio communication.

In order to communicate effectively, the remote user 21 must know accurately which point or object is being viewed by the local user 12. This is done by the local user 12 grabbing an image (or video) with the camera 37 and sending it over to the remote user 21. Since the local user 12 views the object directly through the exit window 30, while the camera 37 sees the object through the window 36, there is a need for an initial alignment, which consists of aligning the cross A (FIG. 5), which is located at the center of the display screen 39, with the line of sight of the camera 37 as described in greater detail below with reference to FIG. 8 of the drawings.

Figure 7:
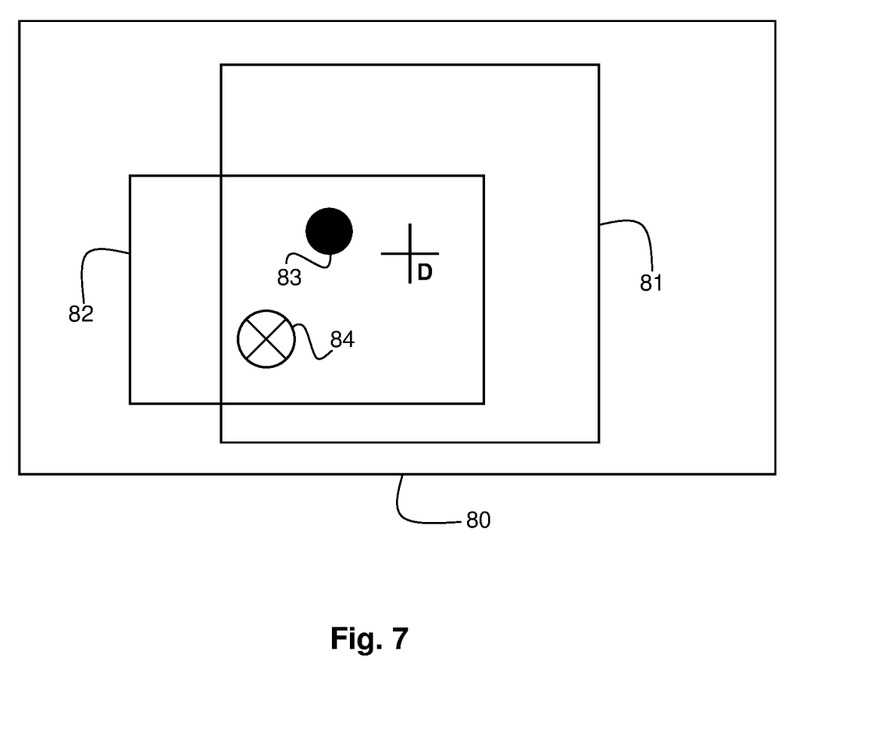
FIG. 7 depicts the field of view (FOV) of the device camera.

FIG. 7 depicts the camera field of view (FOV) 80, which as noted above is 70°×42°. A reduced area of the camera field of view 80 is actually displayed on the screen of the smartphone 19. We will refer to this reduced area denoted 81 in the figure as the smartphone FOV. Which area of the camera field of view 80 is displayed on the smartphone is determined by the alignment process. In this example the part of the camera field of view displayed on the phone is 35°×35°. The center of the reduced area displayed on the smartphone screen is denoted by a cross D. Also shown is an equipment console 82, constituting an object that lies completely within the camera FOV 80 but is seen only partly in the smartphone FOV 81. Also shown is a knob 83 and a screw head 84, both being part of the equipment console 82.

Figure 8:
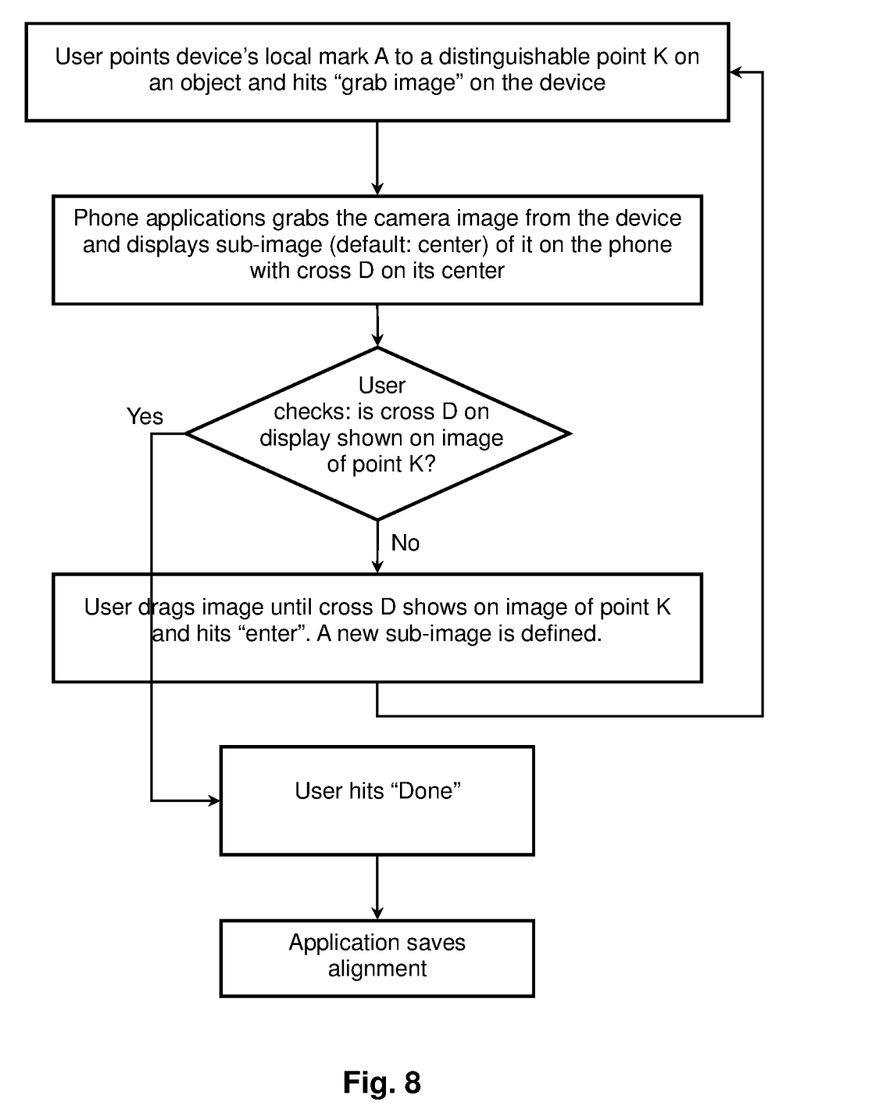
FIG. 8 is a flow diagram of a procedure carried out in conjunction with a smartphone application for initial alignment between the device camera and a smartphone display.
Figure 9:
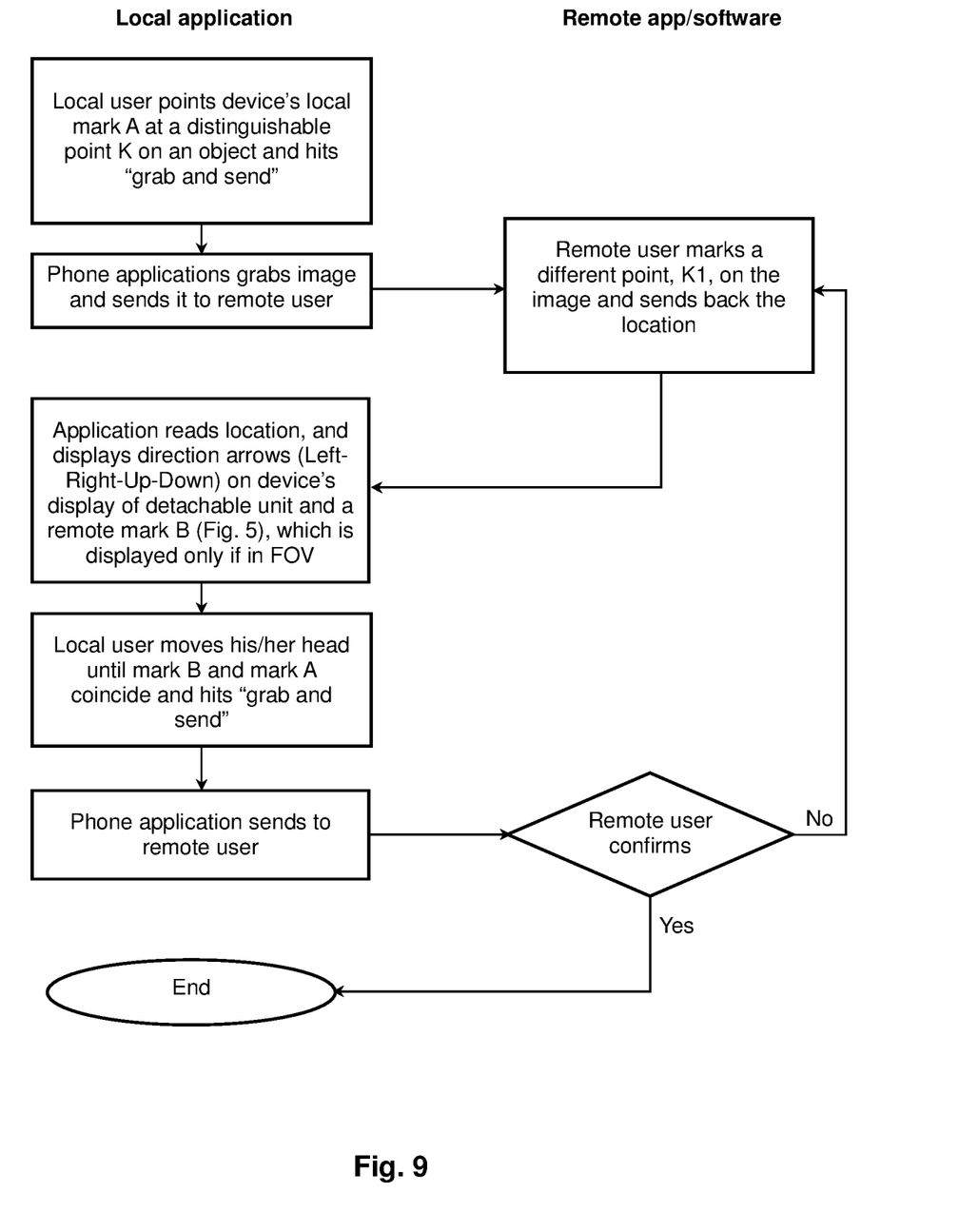
FIG. 9 is a flow diagram of a procedure carried out in conjunction with a smartphone application for conveying a location of an object of interest to a remote user.

Before starting the alignment, the reduced area 81 of the camera FOV displayed on the smartphone is centered with the camera FOV 80 as shown in the figure. This is done under the control of the smartphone application, which knows the pixel resolution and the center of the smartphone screen and also knows the pixel resolution and center of the camera FOV. The local user starts the alignment process as shown in FIG. 8 by directing local mark A located at the center of the micro-display 39 to a distinguishable point of the equipment console 82, such as the screw head 84, and grabs an image using the smartphone.

The local user 12 looks at the camera image as it appears on the smartphone screen, and verifies that the mark D points to the same distinguishable point. If this is not the case, the user drags the image on the screen relative to mark D until alignment is achieved, and saves the alignment. This process can repeat itself until a satisfactory alignment is achieved. The alignment process in effect determines the x-y offset of the center of the camera FOV designated by the mark D to the center of the smartphone display that needs to be applied in order to ensure that the local smartphone 19 is properly aligned with the camera 37 in the device 10.

To demonstrate a typical operation, we will assume a local user 12 is an operator who needs instruction relating to an observed object i.e. the equipment console 82. In order to enable visual communication, the remote user 21 needs to know where exactly the local user 12 is looking at, and in return, send him other locations to look at. This is done as follows:

The local user 12 directs the local mark A to a distinguishable point of the equipment console 82 e.g. the knob 83, grabs an image and sends it, through the local smartphone application, to the remote user 21.

The remote user 21 marks another point, for example the screw head 84 in the screen image, either on a remote smartphone or a PC. This is done by the remote user pointing to the screw head 84 with a finger or stylus on a touchscreen of the remote smartphone or using a mouse on a PC on which the image conveyed from the local smartphone 19 is displayed. This mark is referred to as a remote mark, whose location is sent back to the local user 12 and displayed on the micro-display 39 (B in FIG. 5) if the object or feature to which it relates appears within the field of view of the micro-display 39.

If the remote mark is within the field of view (10°×8.3°) of the micro-display 39, once the local user directs the local mark A to the screw head 84 by shifting his line of sight, the Remote Mark will appear on the screw head 84 seen by the local user 12.

If the location in the camera FOV to which the remote user wants to direct the local user's attention is outside the field of view of the micro-display 39, the software application in the local smartphone 19 displays an arrow or equivalent navigation aid on the micros-display 39 to direct the user to the correct location.

The local user can further verify the location sent to him by directing the Local Mark to the screw head 84. Remote User can send a confirmation, or correction if needed.

Alternatively, the remote user 21 can send more detailed graphical marks which will appear on the display in their correct location, such as mark C in FIG. 5. So for example, the remote user can mark the outline or contour of a feature to which he wants to direct the user's attention or he can sketch supplementary information.

Alternatively or additionally the required feedback confirming to the remote user that the local user is now aligned with the correct point of interest can be achieved using standard tracking techniques using the IMU 70 sensors or the image.

Alternatively, the image data can be used to place the remote mark at the right location.

It is clear that any combination of IMU and the image can be used for tracking i.e. IMU only, image only or both.

In both cases, the device tracks the image so that in each point of time marks are projected on their corresponding objects.

Alternatively, if communication bandwidth allows, real time video transmission may be used.

The use described above, i.e. communication between a local user and a remote user for maintenance purposes, is only an example. Many other applications are also possible, such as outdoor navigation (urban or rural), in-door AR for projecting virtual objects onto the environment and gaming (such as Pokémon). Processing can be done locally or with support of an external server.

Regardless of the exact nature of the communication between the local and remote users, the device must be aligned in order to ensure that the remote user sees the same scene as the local user. This requires that the line-of-sight of the local user be established and that an object of interest be aligned with the user's line-of-sight. In the embodiments described this is done using the micro-display which displays an image such as a cross-hair that is projected at a distance on to the scene observed by the local user. The micro-display 39 thus constitutes a line-of-sight guide unit for displaying a mark at a center of the user's field of view for directing a line of sight of the user toward the scene. The micro-display also serves to project an image conveyed to the local smartphone by the remote user. However, there may be applications where there is no need to receive marks from the remote user. In such cases, there may be no need for the micro-display and line-of-sight guide unit make take other forms, such as a reticle that is etched or otherwise formed at the focus of the optics 40 so as to be seen by the local user at infinity.

The hand-held communications device according to the invention is typically a suitably programmed smartphone. However, it may equally be any portable, preferably handheld, computer having a communications interface and an ability to move the camera image relative to the microdisplay image. To this end, the hand-held communications device typically has a touch-screen for dragging the image. However, the hand-held communications device may operate under suitable software to allow the display image to be moved using a mouse or other pointing device. Therefore, within the context of the invention and the appended claims, the term "computer" is intended to embrace any device having a CPU, a display, a GUI (graphical user-interface) and a communications interface.

Likewise, the invention contemplates a computer program being readable by a processing unit in the hand-held communications device for executing the method of the invention. The invention further contemplates a machine-readable memory tangibly embodying a program of instructions executable by the machine for executing the method of the invention.

The invention claimed is:

1. A system comprising:
  a detachable spectacles-mounted augmented reality (AR) device and a clip-on unit attached or attachable to the AR device, said AR device comprising:
  a housing configured for supporting the clip-on unit,
  an exit window and an entrance window in the housing through which the user observes a scene,
  a communications interface for coupling to a portable communications device,
  a micro-display within the housing coupled to the communications interface for receiving from the portable communications device an image for displaying at the user's field of view, and
  optics within the housing including the entrance window, a see-through optical element, the exit window and an objective configured for projecting the image at a distance for super-imposing on to an external scene viewed by the user;
  the clip-on unit having an attachment for detachably mounting the AR device in front of a spectacle frame worn by the user and allowing for lateral displacement of the AR device relative to the spectacle frame without moving the attachment for aligning the exit window with a line of sight of the user.

2. The system according to claim 1, wherein the clip-on unit is configured for mounting on to the front of the spectacles frame without any need to mount the device or any of its components on the temple pieces (side arms) of the user's spectacles.

3. The system according to claim 1, wherein:
  the objective has a focal plane that is located at a plane of the micro-display so that an image of the micro-display is created at infinity, and
  the exit window is optically coupled to both the microdisplay and the entrance window via the see-through optical element for conveying the image projected on the scene to the user's eye;
  whereby the user sees the real scene through the seethrough optics with the image superimposed on a feature in the real scene.

4. The system according to claim 1, wherein the housing is configured such that the exit window is aligned with a single eye of the user without the device obscuring the view of the other eye.

5. The system according to claim 1, wherein the clip-on unit comprises:
   a first member adapted for attachment in front of spectacles worn by the user, and
   a second member attachable to mounting brackets of the device, and being moveable relative to the first member so as to allow the attached device to be moved laterally relative to an eyepiece in said spectacles for aligning the exit window with a line of sight of the user.

6. The system according to claim 1, wherein the micro-display is configured to display information conveyed thereto from a remote user.

7. The system according to claim 6, wherein the micro-display is configured to operate as a line-of-sight guide unit.

8. The system according to claim 7, wherein the line-of-sight guide unit includes a reticle.

9. The system according to claim 1, further including an IMU (Inertial Magnetic Unit) coupled to the communications interface for tracking motion of the device and thereby head motion of the user.

10. The system according to claim 1, wherein the communications interface is wireless.

11. The system according to claim 1, wherein the communications interface is wired.

12. The system according to claim 1 further including:
   a camera inside the housing coupled to the communications interface for imaging the scene observed by the user through a camera window and being configured to convey an image of said scene to the portable communications device.

13. The system according to claim 12 further including a portable communications device, wherein the portable communications device has a touchscreen configured to display a superposition of the camera image and a digital mark and is configured to provide input means for dragging the image on the touchscreen relative to the digital mark to determine the x-y offset of the center of the camera field-of-view.

14. A method for using the system according to claim 13 for aligning respective fields of view as seen by a local user and the camera in the augmented-reality device mounted on a spectacle frame worn by the user wherein the camera and the user view a scene via different windows and an eye of the user views the scene in alignment with a marker projected on to the scene so as to direct a line of sight of the user toward a first feature of interest in the scene, the method comprising:
   laterally displacing the clip-unit of the device relative to the spectacle frame for aligning the exit window with a line of sight of the user;
   capturing the scene observed by the camera as a first digital image;
   conveying the first digital image of the scene from the camera to a portable communications device for display on a touchscreen thereof;
   superimposing on the touchscreen an indicium in correct spatial alignment with the first feature of interest; and
   if necessary, dragging the first digital image until the indicium is aligned with the first feature of interest;
   whereby the respective fields of view as seen by the user and the camera aligned.

15. A method for using the system according to claim 13 for interactively conveying digital images between a local user wearing the AR device and a remote user, the method comprising:
   carrying out the method of claim 14 to align respective fields of view as seen by a local user and the camera in said assembly; and
   conveying the first digital image to a display device viewed by the remote user so that the remote user sees the scene and the first feature of interest in similar spatial alignment as observed by the local user.

16. The method according to claim 15, further including receiving at the portable communications device a navigation aid for display on the micro-display so as to be superimposed on the first digital image of the scene for directing the local user to a second feature of interest in said scene.

17. The method according to claim 16, wherein the navigation aid is a mark that is superimposed on the first digital image in alignment with the second feature of interest.

18. The method according to claim 16, wherein the navigation aid directs the local user to change said line of sight if the second feature of interest is not present in the first digital image.

19. The method according to claim 15, wherein a third image is conveyed to the portable communications device from a remote communications device used by the remote user.

* * * * *